US009213953B1

(12) United States Patent
Kassmann et al.

(10) Patent No.: US 9,213,953 B1
(45) Date of Patent: Dec. 15, 2015

(54) MULTIVARIABLE LOAD BALANCING IN A FULFILLMENT NETWORK

(75) Inventors: Dean E Kassmann, Seattle, WA (US); Russell Allgor, Brentford (GB); Mehmet Tolga Cezik, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 778 days.

(21) Appl. No.: 12/210,895

(22) Filed: Sep. 15, 2008

(51) Int. Cl.
G06Q 10/00 (2012.01)
G06Q 10/06 (2012.01)

(52) U.S. Cl.
CPC .................................. *G06Q 10/0631* (2013.01)

(58) Field of Classification Search
None
See application file for complete search history.

(56) References Cited

U.S. PATENT DOCUMENTS

| | | | |
|---|---|---|---|
| 5,301,320 A | | 4/1994 | McAtee et al. |
| 5,530,744 A | | 6/1996 | Charalambous et al. |
| 5,623,413 A | | 4/1997 | Matheson et al. |
| 5,890,133 A | | 3/1999 | Ernst |
| 6,148,324 A | * | 11/2000 | Ransom et al. ............... 718/105 |
| 6,327,363 B1 | | 12/2001 | Henderson et al. |
| 6,519,571 B1 | * | 2/2003 | Guheen et al. ............. 705/14.66 |
| 6,550,057 B1 | | 4/2003 | Bowman-Amuah |
| 6,622,127 B1 | | 9/2003 | Klots et al. |
| 6,775,371 B2 | | 8/2004 | Elsey et al. |
| 6,970,841 B1 | | 11/2005 | Cheng et al. |
| 6,975,937 B1 | | 12/2005 | Kantarjiev et al. |
| 7,058,587 B1 | * | 6/2006 | Horne .......................... 705/7.22 |
| 7,062,617 B2 | * | 6/2006 | Dundas ......................... 711/154 |
| 7,111,300 B1 | | 9/2006 | Salas et al. |
| 7,177,825 B1 | | 2/2007 | Borders et al. |
| 7,243,074 B1 | * | 7/2007 | Pennisi, Jr. ................... 705/7.22 |
| 7,295,990 B1 | * | 11/2007 | Braumoeller et al. ....... 705/7.31 |
| 7,370,005 B1 | | 5/2008 | Ham et al. |
| 7,430,519 B2 | | 9/2008 | Thompson et al. |
| 7,499,867 B2 | | 3/2009 | Lahey et al. |
| 7,747,543 B1 | * | 6/2010 | Braumoeller et al. ........ 705/330 |
| 7,760,626 B2 | * | 7/2010 | Malpani et al. ............... 370/230 |
| 7,848,953 B2 | * | 12/2010 | Kahlon et al. ................. 705/22 |
| 8,140,183 B2 | * | 3/2012 | Waddington et al. ......... 700/216 |
| 8,249,917 B1 | * | 8/2012 | Kassmann et al. .............. 705/12 |
| 2001/0029525 A1 | | 10/2001 | Lahr |
| 2002/0054587 A1 | * | 5/2002 | Baker et al. ................... 370/352 |
| 2002/0152001 A1 | | 10/2002 | Knipp et al. |
| 2002/0188486 A1 | * | 12/2002 | Gil et al. ............................ 705/7 |
| 2002/0194251 A1 | | 12/2002 | Richter et al. |
| 2003/0028644 A1 | * | 2/2003 | Maguire et al. ............... 709/226 |
| 2003/0172007 A1 | * | 9/2003 | Helmolt et al. ................. 705/28 |

(Continued)

FOREIGN PATENT DOCUMENTS

WO WO 97/04383 * 2/1997 ................ G06F 9/00

OTHER PUBLICATIONS

Agatz, N. A. (May 2007). E-fulfillment and multi-channel distribution—A review. Eu J. of Operational Research 187, p. 339-356.*

(Continued)

*Primary Examiner* — Peter L Ludwig
(74) *Attorney, Agent, or Firm* — Lee & Hayes, PLLC

(57) ABSTRACT

A multivariable load balancing system for a merchandise fulfillment network is described. The multivariable load balancing system employs Multiple-Input-Multiple-Output (MIMO) load balancing functionality or other closed loop control functionality to control which fulfillment resources (such as fulfillment centers) are to handle customer orders to reduce real world costs.

25 Claims, 8 Drawing Sheets

(56) References Cited

U.S. PATENT DOCUMENTS

| | | | | |
|---|---|---|---|---|
| 2003/0208392 | A1* | 11/2003 | Shekar et al. | 705/8 |
| 2004/0254825 | A1* | 12/2004 | Hsu et al. | 705/8 |
| 2004/0254842 | A1 | 12/2004 | Kirkegaard | |
| 2005/0075748 | A1 | 4/2005 | Gartland et al. | |
| 2005/0165881 | A1 | 7/2005 | Brooks et al. | |
| 2005/0198200 | A1* | 9/2005 | Subramanian et al. | 709/218 |
| 2005/0246042 | A1* | 11/2005 | Bickley et al. | 700/99 |
| 2006/0149413 | A1 | 7/2006 | Perez et al. | |
| 2006/0224496 | A1 | 10/2006 | Sandholm et al. | |
| 2008/0154709 | A1* | 6/2008 | Ham et al. | 705/10 |
| 2009/0307096 | A1* | 12/2009 | Antonellis | 705/15 |
| 2010/0250742 | A1* | 9/2010 | Leighton et al. | 709/224 |
| 2010/0262453 | A1* | 10/2010 | Robinson et al. | 705/9 |

OTHER PUBLICATIONS

Layden, John E. (1998). A rapidly changing landscape: MES, ERP, and scheduling. Manufacturing systems, p. A10.*

Armistead, Colin G. et al. (2002). The "coping" capacity management strategy in services and the influence on quality performance. Int'l J. of Service Industry Management, 5(2), p. 5-22.*

Silver, E. A. et al (1998). Inventory management and production planning and scheduling (3d ed.). John Wiley & Sons: New York.*

Dictionary definition of "merchandise" from Random House Dictionary (Unabridged), retrived from www.dictionary.com.*

Aligor, Russell, et al. (2005). The benefits of Re-Evaluating Real-Time Fulfillment Decisions. Amazon.com.*

Liu, X (Dec. 2007). Optimal multivariate control for differentiated services on a shared hosting platform. Proceedings of the IEEE Conference on Decision and Control, New Orleans, LA, USA (hereinafter "Liu").*

Kassman, Dean & Allgor, Russell (2006). Supply chain design, management and optimization. Amazon.com. Elsevier Pub.*

Definition: "share" as "A part or portion of something owned, allotted to, or contributed by a person or group." Related words: part, percentage, portion, partake. See World English Dictionary, 1998.*

Define: "disparate" as "distinct in kind; essentially different; dissimilar: disparate ideas." See Random House Dictionary, 2013.*

Kim, H (2004). Reliability Modeling with Load-Shared Data and Product-Ordering Decisions Considering Uncertainty in Logistics Operations. Dissertation for Georgie Institute of Tech.*

Russell Allgor, et al. (available as early as Apr. 14, 2005 at https://web.archive.org/web/20050515000000*/http://web.mit.edu/sgraves/www/papers/sma_Ping_Jan05.pdf). The Benefits of Re-Evaluating Real-Time Fulfillment Decisions. MIT; Amazon.com (hereinafter "Allgor").*

Network Load Balancing Technical Overview (archived back to Dec. 16, 2007). Microsoft Corp. publication (hereinafter "Load Balancing").*

U.S. Appl. No. 09/965,121, filed Sep. 27, 2001, "Dynamically Determining Actual Delivery Information for Orders Based on Actual Order Fulfillment Plans."

U.S. Appl. No. 09/965,125, filed Sep. 27, 2001, "Generating Current Order Fulfillment Plans Based on Expected Future Orders."

Final Office Action for U.S. Appl. 11/296,859, mailed on Jul. 11, 2011, Dean E. Kassmann, "Load Balancing for a Fulfillment Network".

"What is PID—Tutorial Overview," available at <<http://www.expertune.com/tutor.html, accessed on Feb. 18, 2006, 5 pages.

* cited by examiner

MULTIVARIABLE LOAD BALANCING IN A FULFILLMENT NETWORK

BACKGROUND

In e-commerce, customers purchase merchandise by accessing a website, selecting one or more items, entering payment information, and indicating a preferred delivery date. In most cases, from the customer standpoint, the merchandise later "magically" appears on their doorstep at or before the delivery date. This easy and convenient form of shopping has spawned an online retailing industry that is growing rapidly each year.

The behind-the-scenes processes that fulfill online purchase orders and ensure timely and efficient delivery of merchandise to customers are not, however, magic. Indeed, the fulfillment processes are quite complex. Generally, the fulfillment processes can rely on a fulfillment network that includes geographically dispersed fulfillment centers for handling orders. Consider the task of fulfilling a typical common purchase order for diverse items, such as a book, a toy, a DVD, and a digital camera. Suppose further that the customer lives in California, but the e-commerce company has fulfillment centers in other parts of the country. Determining which center or centers should handle all or parts of the task is a difficult problem. Moreover, the solution to this problem has important cost-related implications, as choosing a non-optimal fulfillment center can result in higher operating costs. Accordingly, there is a need to effectively manage selection of fulfillment resources to fulfill purchase orders for merchandise that is ordered online.

SUMMARY

A multivariable load balancing system for a merchandise fulfillment network is described. In one exemplary implementation, the multivariable load balancing system employs n dimensional multiple-input-multiple-output (MIMO) control to load-balance the processing of customer orders among different fulfillment resources in the fulfillment network.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items. A reference number having a parenthetical suffix (as in "120(1)") identifies a species of the feature represented by the general reference number (e.g., "120"); further, use of the general reference number without a parenthetical suffix (as in "120") identifies any one or more of the species.

DETAILED DESCRIPTION

Figure 1:
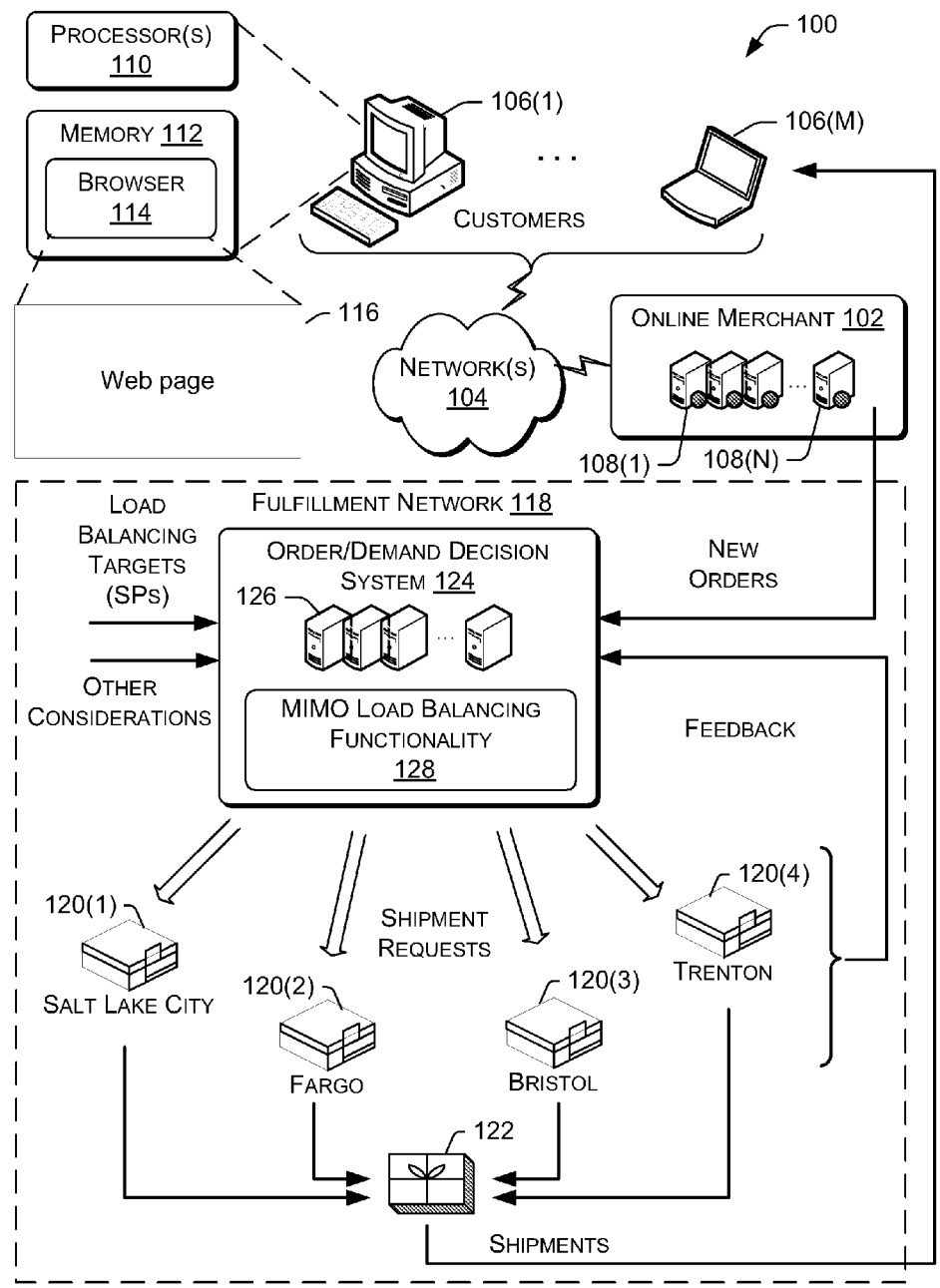
FIG. 1 illustrates an example of architecture for a fulfillment network in which MIMO load balancing functionality can be deployed.

According one implementation, this disclosure is directed to strategies for balancing the processing of requests (such as online customer orders for merchandise) across multiple fulfillment resources that form a fulfillment network. The balancing is achieved using control functionality that employs a closed loop control algorithm. One exemplary implementation of such control functionality uses an n-dimensional multiple-input-multiple-output (MIMO) control algorithm to allocate a percentage of processing tasks to different fulfillment resources in the network.

As used herein, the terms "fulfillment network" and "fulfillment resource" should be broadly construed. A fulfillment network generally refers to any infrastructure for processing requests for items of any nature (including, but not limited to, online orders for goods and/or services). A "fulfillment resource" refers to any component of the infrastructure used to process the requests.

In an implementation described in this disclosure, a fulfillment network may include a plurality of fulfillment centers for handling customer orders. The plurality of fulfillment centers may belong to specified classes of fulfillment centers. And each center, in turn, may include multiple processing queues for handling orders. Each such distinct aspect of the fulfillment network can be considered a fulfillment resource. In this case, the fulfillment network is devoted to distributing items from one or more inventories of items to end-user recipients. The outbound flow of items can be throttled based on a combination of variables.

However, the principles described herein can be applied to other business and technical scenarios. In one such alternative scenario, a fulfillment network can be applied to distribute items to one or more intermediary entities that, in turn, further provide the items to other entities. For instance, the fulfillment network can be applied to distribute items to one or more merchants that, in turn, provide the items to their respective customers.

In an alternative scenario, a fulfillment network comprising one or more fulfillment resources can be applied to control a supply chain inflow of merchandise items to one or more inventories of items. In this case, one or more suppliers can instruct a merchant to add one or more items of merchandise to one or more inventories of items. For instance, the fulfillment network can be applied to control the flow of merchandise items from third party entities (e.g., vendors) to a central merchant, which, in turn, offers these items for distribution (e.g., sale) to its customers. The inbound flow of items can be throttled based on any variable or combination of variables.

In yet another alternative scenario, a fulfillment network comprising one or more fulfillment resources can be applied to control an inflow of merchandise orders to the one or more fulfillment resources. In this case, one or more controllers can instruct an assignment system to assign a share of the total orders for merchandise to one or more fulfillment resources. For instance, the fulfillment network can be applied to control the flow of orders to a class of fulfillment centers or to fulfillment resources, which, in turn, fulfill these orders for distribution (e.g., shipping) to the customers who placed the orders. This inbound flow of orders to particular fulfillment centers can be throttled based on any variable or combination of variables.

Still further use scenarios are possible.

As used herein, an "item" refers to any discrete resource that can be purchased or sold (or, more generally, acquired, disposed of, distributed, transferred, stored, processed or reprocessed, recycled, etc.), or subject to some other action by any entity.

An "order" refers to a request to purchase or otherwise acquire one or more items or to perform some other action or actions pertaining to an item or items. To facilitate discussion, the term "order" as used herein can refer to either a single request by a user (or other entity) to, e.g., acquire a particular item, or a component request in a multi-item request to acquire multiple items. More generally, the terms "order" and "request" are used interchangeably herein.

Architecture

FIG. 1 illustrates an example of one architecture 100 in which a fulfillment network for fulfilling customer orders can be used. The architecture 100 can include many online merchants, including representative merchant 102. Merchant 102 hosts a website accessible over one or more communication couplings or networks 104 by many customer computing devices 106(1), . . . , 106(M). The network(s) 104 represents any type of network or combination of networks, such as a wide area network (e.g., the Internet), an intranet, and so forth. The networks 104 can be implemented using any combination of networking technology, such as various hardwired and wireless links, routers, gateways, name servers, and so forth (not shown).

The online merchant 102 hosts the website using one or more web servers 108(1), . . . , 108(N), perhaps arranged as a server farm, including conventional front-end and back-end processing functionality. Other server architectures can also be used to host the site. The online merchant 102 can handle requests and/or orders from many users and supply, in response, various web pages that can be rendered at the customer computing devices 106. The merchant website is representative of essentially any site that sells, rents, licenses, trades, or otherwise provides goods (including without limitation tangible goods, digital goods available for download, etc.), services, or other forms of merchandise (generally referred to herein as "merchandise items"). Or the merchant 102 may represent an entity that disseminates informational resources (e.g., news, customer service information, etc.) to the computing devices 106, or provides some other kind of service in which any kind of customer request, typically placed by human individuals or on behalf of human organizations, can be fulfilled.

The customer computing devices 106 (also referred to as "client computers" or simply "clients") are illustrated as including a personal computer and a laptop computer, but can also be implemented as other devices, such as a set-top box, a personal digital assistant (PDA), a game console, a laptop computer, a mobile telephone, and so forth. Each computing device 106 is equipped with one or more processors 110 and memory 112 to store applications and data. A browser application 114 can be implemented at the computing device 106 (as shown in FIG. 1), or can alternatively be implemented by a remote server site, or can alternatively be implemented in distributed fashion at both local and remote sites, and so on. The browser application 114 provides access to the website hosted by the online merchant 102. In particular, the browser application 114 renders web pages served by the merchant 102's website on an associated display.

In one exemplary implementation, the web pages present various items being offered by the online merchant 102, or marketed through the merchant website. One exemplary webpage 116 is shown that offers different types of portable computing devices for sale. The webpage 116 can further include many other categories of items, such as books, music, and so on. Customers are free to browse the merchant 102's website and purchase items. This invokes a series of operations to be described below. (It should be noted that the processing operations described herein can also be applied to scenarios in which the customer makes requests that do not necessarily involve the purchase of goods and services, but which nevertheless consume the architecture 100's processing resources in some fashion. For instance, the principles described herein can be invoked when the customer rents an item, or merely borrows an item free of charge, and so on. However, to facilitate explanation, this disclosure will emphasize the exemplary scenario in which the customer makes requests that involve the purchase of goods or services to be physically delivered to the customer.)

When a customer purchases an item (or items) from the merchant 102's website, the customer may enter payment information and shipping preferences. The shipping preferences may optionally ask the customer to specify a method of delivery (e.g., overnight courier, priority mail, etc.) and/or a target delivery date (e.g., 1 day, 2 day, 3-7 days, etc.). The various shipping options usually have different associated costs, which may optionally be passed on to the customer in whole or in part. To ensure customer satisfaction, the online merchant 102 seeks to deliver the item on time and according to the customer's shipping preferences. At purchase, the merchant generates a fulfillment order (or simply "order") that specifies the selected item and the customer's shipping preferences.

A fulfillment network 118 receives the orders from the online merchant 102 and processes these orders (by "fulfilling," e.g., carrying out, the orders). The fulfillment network 118 can be owned and operated by the online merchant 102. Alternatively, the network 118 can be owned and operated at least in part by a separate commercial entity. For instance, in one case, the fulfillment network 118 can be implemented by the merchant 102 and can be used to exclusively service the fulfillment orders generated by the merchant 102. In another case, the fulfillment network 118 can service multiple different merchants.

The fulfillment network 118 includes multiple fulfillment resources, which in this exemplary instance are used to carry out the customer orders. As noted above, a fulfillment resource refers to any functionality used to process fulfillment orders—in effect, to fulfill the orders. In the simplified case shown in FIG. 1, the fulfillment resources correspond to different fulfillment centers 120(1)-120(4).

The fulfillment centers 120(1)-120(4) can be established geographically to accommodate orders from various population regions. Namely, in the illustrated example, four fulfillment centers 120(1)-120(4) are arranged within the geographical region of the United States or North America. These exemplary centers include: a site 120(1) in Salt Lake City, Utah; a site 120(2) in Fargo, N. Dak.; a site 120(3) in Bristol, Tenn.; and a site 120(4) in Trenton, N.J. Note that the network 118 can have more or less than four fulfillment centers. Additionally, one or more of the fulfillment centers may belong to a different class of fulfillment centers. For example, classes of fulfillment centers and fulfillment resources may be defined by one or more associated merchants, a class of merchandise items in inventory at the one or more fulfillment centers or serviced by the one or more fulfillment resources (e.g. books, DVDs, etc.), or as managed or unmanaged fulfillment centers, such as resources to fulfill orders for heavy items or dropshippers. Further, the network 118 can deploy other fulfillment centers to serve other geographical regions besides North America, such as Europe, South America, and Asia, and/or individual countries in these regions.

In one implementation, the fulfillment centers 120(1)-120(4) can warehouse the merchandise (or are otherwise associated with an inventory of such merchandise). The fulfillment centers 120(1)-120(4) endeavor to fulfill the orders received by the network 118 from the online merchant 102 from their respective inventories. Orders can be filled using automated systems, trained employees, or a combination of systems and employees. For a particular order, a fulfillment center 120 locates the item purchased by the customer and places the item into a package 122, and then ships the package 122 to the customer according to the customer's shipping preferences.

In actual practice, a customer's order may specify multiple items. Depending on various considerations, the fulfillment network 118 may rely on a single fulfillment center 120 to process this multi-item order and then to ship the items in one or more packages. Or the fulfillment center 120 may rely on multiple different fulfillment centers 120 to process the order in piecemeal fashion and to ship the order out from multiple different locations. As noted above, to facilitate discussion, the term "order" as used here can refer to either a single request by a user to acquire a particular item, or a component request in a multi-item order to acquire multiple items. In other words, this disclosure will generally describe the work performed by a fulfillment center 120 in terms of the volume of items it outputs to customers, adopting an agnostic (open-ended) approach as to whether these items were specified in a single-item customer order or a multi-item customer order. This disclosure also adopts an agnostic approach as to the manner in which these items are packaged for output to the customer.

The fulfillment network 118 may include an order/demand decision system 124 (or simply "decision system" 124) that determines, in order-by-order fashion, which fulfillment resources should fulfill the individual items in the orders received from the online merchant 102. The decision system 124 can be implemented using a computerized order-by-order decision process. This process can be implemented using one or more servers or other computing functionality, represented by the server cluster 126. The decision system 124 can be implemented at a single site, or be distributed across multiple sites.

More specifically, in the simplified scenario shown in FIG. 1, the role of the decision system 124 is to determine which fulfillment centers 120(1)-120(4) should fulfill the orders received by the online merchant 102. There are many considerations that go into this decision including, for example: the location of the customers, the location of the fulfillment centers, the merchandise availability at the centers, the centers' capabilities, feedback regarding order-filling performance of fulfillment resources, shipping costs, shipping fees paid by customers, item costs, material costs, processing costs, other intangible costs (such as penalty costs for shipping an order late), and so forth. Other considerations can include high-level constraints, such as those that affect labor or outbound shipping capacity, although these constraints can alternatively be omitted from consideration.

The decision system 124 included in fulfillment network 118 may alternately determine which fulfillment resources should fulfill the individual items in the orders received from the online merchant 102 based on system-level goals or set targets. The system level goals and set targets may be based on performance measurements, opportunity costs associated with using particular fulfillment resources, and so forth.

The decision system 124 bases its assignment decisions on load balancing considerations. To this end, the decision system 124 includes control functionality that employs closed loop control including Multiple-Input-Multiple-Output (MIMO) load balancing functionality 128, which influences order assignment decisions (to be described below). Different varieties of closed loop control algorithms can be used to implement the control functionality. To facilitate discussion, this disclosure primarily discusses the use of a Multiple-Input-Multiple-Output (MIMO) control algorithm that generates a vector of costs u to define variables which are used by the decision system 124 as one concrete implementation of the control functionality. Accordingly, FIG. 2 (below) shows an exemplary decision system 124 including MIMO load balancing functionality 128. In operation, by way of broad overview, the decision system 124 manages the work performed by the fulfillment centers 120 to satisfy various load balancing targets (to be described below).

Decision System Control Structure

To summarize some of the terms to be used:

System-level goals are high level goals defined for the fulfillment network by a planning forecasting system or other entity such as analysts.

Shipped items (SIs) reflect the orders actually fulfilled by the fulfillment resources, which, in one exemplary case, can be measured as the number of merchandise items actually shipped by the fulfillment facilities 120.

Set point targets (SPs) define the load balancing goals that govern the operation of different respective fulfillment resources.

Share targets (Ts) define the load balancing goals that govern the share of fulfillment network volume assigned to respective fulfillment resources.

Assigned items (AIs) reflect the orders assigned to the different fulfillment resources.

Vector of costs (u) define variables, which are used by the decision system, as one consideration, to drive shares of fulfillment network volume to different fulfillment resources. The meaning associated with this cost variable is discussed in further detail in a later section.

Feedback values (f) reflects differences between volume of order assignments sent to each fulfillment resource assigned item values (AI) and share targets (T).

A periodic control structure utilizes logic that is external to a network fulfillment center assignment module. The periodic control structure is discussed in greater detail below.

It can be seen that the control structure of the decision system 124 provides control of order assignments on a real time basis or on a substantially real time basis. In other words, the control structure may apply a closed loop control on a periodic basis to "drive" the fulfillment network 118 toward desired goals in view of the prevailing performance of the network 118. This periodic basis of control is analogous to the way a sensor control loop of a vehicle windshield wiper system automatically triggers, in a real time manner, in the presence of precipitation to maintain visibility.

Figure 2:
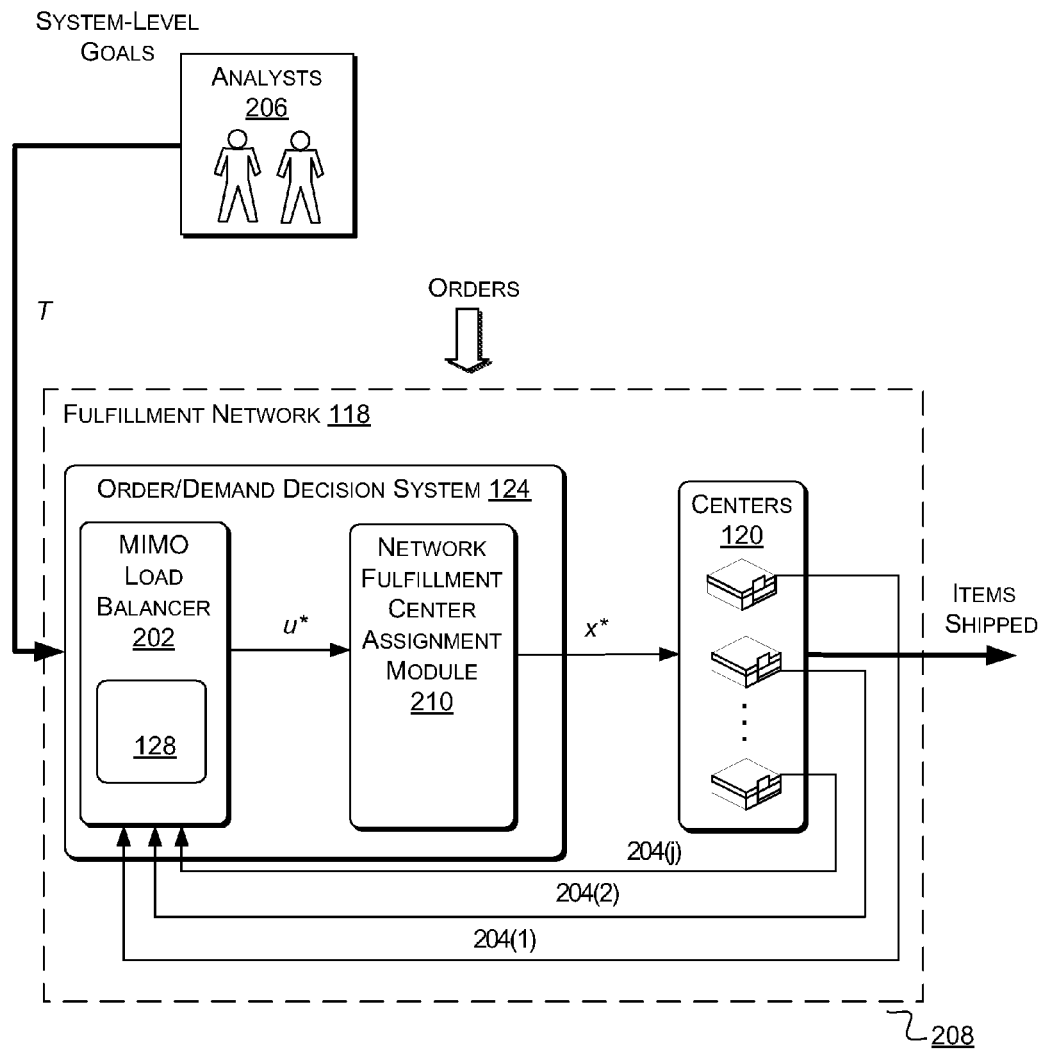
FIG. 2 shows an example of a decision system in a fulfillment network using multivariable load balancing.

FIG. 2 shows a decision system 124 (deployed as a decision system 124, although decision system 124 may also or alternately be deployed as global decision system 402, discussed below). Decision system 124 comprises a MIMO load balancer 202, and includes, as a component, the series of loops 204. MIMO load balancer 202 represents an automated control system.

FIG. 2 shows an exemplary decision system 124 including MIMO load balancing functionality 128. The MIMO load balancing functionality 128 computes load-related costs for different fulfillment centers 120 (as defined above). The decision system 124 takes these load-related costs into account as one consideration in deciding what share of the expected volume of the fulfillment network should be assigned to which fulfillment centers 120 for the processing of customers orders.

In operation, by way of broad overview, the decision system 124 manages the work performed by the fulfillment centers 120 to satisfy various load balancing targets (to be described below). By virtue of the MIMO strategy used by the MIMO load-balancing functionality 128, the decision system 124 can be set to perform this control periodically or in real-time as one of the multiple variables. Optimal load balancing targets accommodating a myriad of other considerations may be employed to control distribution of the volume of orders within the network 118. Several such examples of "other considerations" were mentioned above.

Providing for automatic adjustment of targets is beneficial because it helps reduce the overall cost of processing customer orders. That is, while rigidly forcing the network 118 to adhere to load balancing targets on an order-by-order basis is not optimal, the overall cost of processing customer orders would be significantly reduced (e.g. by around 90%) by periodically rebalancing the network load to meet share targets defined for fulfillment centers. Additionally, the periodic rebalancing accounts for increases in network load (e.g., 30% more volume through the system) without corresponding order-by-order calculations. The rebalancing period is set to minimize thrash while maximizing efficiency. In at least one implementation, the rebalancing period is set at a predefined time (e.g., four hours, six hours, twelve hours, twenty-four hours, etc.). In another implementation, the rebalancing period is not set at a predefined time, but is instead defined as a time-range, (e.g., 1-12 hours). In accordance with at least one implementation, the rebalancing period is set based on a determined threshold of diminishing returns to avoid deleterious costs on the fulfillment network 118. In accordance with at least one implementation, more than one of the above exemplary aspects may be selectively employed.

In at least one implementation, share targets per fulfillment center are defined as fixed endpoints for a fixed time and reset at the end of the fixed time (e.g., a target endpoint per week), to control the fulfillment network. In another implementation, share targets per fulfillment center are defined as a zone (e.g., 30% plus or minus 2%). In yet another implementation, share targets are defined as alternately upper or lower limits. Defining share targets as limits prevents volume assigned to a fulfillment center for a given period, from going beyond the defined limit. The given period may, but need not be a different period than the rebalancing period, (e.g., per day versus per 4 hours) from going beyond the defined limit, (e.g., not less than 3000 units, or not more than 100,000 units). In still another implementation, share targets are defined for a rolling horizon in the future, thus always based on a defined period (e.g., one week out) to help avoid drift and keep targets at a defined average. In accordance with at least one implementation, more than one of the above implementations may be selectively employed to control the fulfillment network.

If load balancing considerations are too rigidly enforced via excessively shortened rebalancing periods, this may impose its own deleterious costs on the fulfillment network 118. The MIMO strategy reduces these costs by permitting flexibility in the parameters for determining load balancing goals. At the same time, the MIMO strategy effectively manages deviation such that fulfillment centers 120 are not allowed to stray too far from the load balancing targets. Adherence to the targets is generally assured over the long run.

FIG. 2 illustrates an exemplary control structure of decision system 124. The control structure allocates order-processing work to the different fulfillment resources (such as the different fulfillment centers 120). The control structure includes the MIMO load balancing functionality 128. Alternatively, the control structure can employ other kinds of closed loop control functionality.

In FIG. 2, more specifically, the control structure defines an integrated system that drives order assignment (optionally including cancellations and reassignments, not shown) toward planned shipment goals (share targets (T)) for each fulfillment center 120 by inducing circulation on the fulfillment network. The system includes a MIMO load balancer 202 which receives system level goals. The system further includes a network fulfillment center assignment module 210 which receives incoming orders and a vector u of load-balancing costs. The system also includes a series of loops 204. FIG. 2 shows the loops 204 as a series of loops enclosed by a dotted-line box. In general, each of the loops shown in FIG. 2 is a loop by virtue of delivering performance information back to MIMO load balancer 202 where a difference between the performance information and targets is calculated in the manner to be described below.

As to the MIMO load balancer 202, according to an example of an implementation, human analysts 206 define system-level goals from which share targets (Ts), which indicate shares of the volume of the fulfillment network, for individual fulfillment resources are determined. Alternately, system-level goals may be defined by a planning forecasting system or other entity. The MIMO load-balancer 202 receives a share target (T) for individual fulfillment resources and performs n dimensional calculations to determine a vector of load-balancing costs u to be applied to the n fulfillment centers to steer the performance of the fulfillment centers 120 to the respective share targets simultaneously. To enable automatic adjustment of these targets, a determination 208 is made to supply performance information to the MIMO load balancer 202 regarding the overall performance of the fulfillment network 118, including the work performed by the various fulfillment centers 120. Different measurements can be used to assess the performance of the fulfillment network 118 as a whole. In one case, the performance measure can correspond to the number of ordered items (SIs) that have been shipped by each fulfillment resource. (The fulfillment centers 120 may ship out the items (SIs) in single-item packages or multi-item packages, so the SIs may or may not correspond to the number of packages shipped by the fulfillment resources.). In another case, the performance measure can correspond to an aggregation of assignments (AIs) fed into the fulfillment resources (e.g., based on the assumption that the assignments into the fulfillment resources will approximately equal the assignments actually completed by the fulfillment resources. In another case, the performance measure can correspond to an aggregation of assignments (AIs) fed into the fulfillment resources, as offset by a number of possible events which may affect the order-filling performance of the fulfillment resources. One such event is the cancellation of orders. Another such event is the reassignment of orders, resulting in orders being "fed" through the fulfillment network 118 two or more times. In addition to these order-based performance metrics, the load balancer 202 can receive other information that reflects the performance of the fulfillment network 118, such as backlog considerations, market conditions, labor conditions, and so forth.

In addition to performance-related information, load balancer 202 receives information regarding system-level goals, such as from analysts 206. These system-level goals may reflect high-level decisions regarding the manner in which the fulfillment network 118 is to be used to fulfill orders. For instance, the system-level goals may indicate, for various application-specific reasons, that it is more desirable to allocate a larger share of the order-filling work to the Bristol facility, compared to the Trenton facility, and so forth. A planning and forecasting system (to be discussed in greater detail below) can be used to define these system-level goals.

The analysts' 206 decisions regarding system-level goals (e.g., business level performance measures for the fulfillment network 118) are automatically implemented such that the system-level goals and orders received by the various fulfillment centers 120 are in direct agreement. At least in part, this agreement is maintained via automating the definition and computation of share targets (Ts). The Ts will drive the fulfillment network 118 so that its performance (as measured by SIs) matches the objectives defined by the system-level goal information. In at least one implementation, the multivariable load balancing system performs to match the objectives with a deviation of less than 1% (e.g., 0.3%).

As to the loops 204, these loops deliver performance information from fulfillment resources, such as fulfillment center 120 to the MIMO load-balancer 202 where the MIMO load balancing functionality 128 calculates feedback (f) representing fulfillment center measured performance versus fulfillment center expected performance as represented by x based on share targets T. To compute feedback (f), the MIMO load balancing functionality 128 via loops 204 receives performance information which reflects the volume of order assignments sent to each fulfillment resource (for example, as discussed above as AIs (representing "assigned items")). MIMO load balancing functionality 128_actually computes feedback (f) as the sum of feedback through time (e.g., $\Sigma f(k)$). The MIMO load balancing functionality 128 is configured to perform MIMO control for a network of fulfillment resources. The resources which make up the fulfillment network 118 being a part of the input in the MIMO system. As noted above, a "fulfillment resource" can correspond to any component of the fulfillment network 118 that handles some aspect of order fulfillment processing. In the simplified case illustrated in FIG. 1, for instance, each fulfillment resource can correspond to a different fulfillment center 120. In this case, the MIMO load-balancing functionality 128 can assign a different set-point (SP) and/or a share target (T) to each of the fulfillment centers 120(1)-120(4), respectively, while accounting for changes made to the Ts of all of the fulfillment centers 120. In other words, there is conservation of volume, similar to the principle of conversation of "mass"—meaning that 100% of the volume must be maintained. Lowering the SP or T for one fulfillment center (e.g., 120(1)) necessarily increases the SP and T for one or more other fulfillment centers (e.g., 120(2)-120(4)). The MIMO load balancer 128 computes a vector of load-balancing costs u which is used to impose constraints on the system, thereby driving the proportion, or share of network volume T that each of the fulfillment centers 120(1)-120(4) will be assigned.

In another implementation, as discussed above, an individual fulfillment center 120 can include multiple processing queues for processing orders. In this context, the MIMO load balancing functionality 128 can assign a different share to each one of these processing queues. For example, consider the case in which there are four fulfillment centers 120(1)-120(4), and each fulfillment center 120 includes two processing queues for handling orders based on the timing of delivery—a close-at-hand delivery queue and a within-the-month delivery queue. This makes a total of eight fulfillment resources. In this case, the MIMO load balancing functionality 128 can assign a different set point SP or share of the volume T to each of these fulfillment resources.

The share targets T can be defined for each of the fulfillment resources in any manner. In one case, the MIMO load-balancer 202 can specify the share targets in terms of the fraction of the amount of the network volume of order-processing work that each fulfillment resource is asked to perform. Consider, for example, the simplified case in which there are three different fulfillment centers 120. The MIMO load-balancer 202 may specify that a first fulfillment center 120(1) is to process X % of the total volume through the network 118, while a second fulfillment center 120(2) is to process Y % of the total volume through the network 118, and a third fulfillment center 120(3) is to process Z % of the total volume through the network 118, such that (X+Y+Z=100% of the volume). The MIMO load-balancer 202 may decide to approximately evenly allocate the work among the fulfillment centers 120 (e.g., such that the three centers each receive between 33% and 34% of the volume); or the MIMO load-balancer 202 may decide, for various environment-specific reasons, to unevenly distribute work among the fulfillment centers 120 (such that, in one illustrative case, the first center receives 50% of the volume, the second center receives 30% of the volume and the third center receives 20% of the volume). In any case, the total volume of work performed by the fulfillment centers 120 should be 100% (due to the principle of conversation of "mass"—meaning that "orders in" must equal "orders out"). However, note that, in the specific case in which each fulfillment center 120 is associated with plural fulfillment resources, all of the fulfillment resources may not be in competition with each other to process a particular order. For example, consider the case in which each fulfillment center 120 includes a separate fulfillment resource to specifically handle orders for books as a distinct category of product. If an order is received for a book, only those fulfillment resources associated with processing orders for books will be invoked as viable candidate resources.

Variable x represents a fraction of total assignments corresponding to the vector of costs u generated by a MIMO load balancer 202. More intuitively stated, in an order fulfillment context, the cost values represent considerations that play a part, along with other considerations, in deciding how orders are allocated among different fulfillment resources. The MIMO load balancer 202 can make these multi-consideration decisions with the end objective of reducing overall real world monetary costs to operate the fulfillment network 118. Accordingly, the vector of cost values u which feed from the MIMO load balancer 202 also has a real world monetary connotation. In other words, the MIMO load balancer 202 can consider the costs as "intangible costs" which must be taken into consideration with a variety of other actual costs. These costs generally all have a bearing on the real world financial efficiency of the fulfillment network 118. For these reasons, the vector of costs u generated by the MIMO functionality 128 can be expressed in units of currency, such as U.S. dollars, euros, etc.

In at least one implementation, as part of a planning or forecasting system, or when first deploying the decision system 124, the online merchant 102 can operate the fulfillment network 118 in a simulated mode. In this mode, the decision system 124 can process a collection of simulated customer orders. The decision system 124 can measure how well the decision system 124 is performing in fulfilling these simulated orders (based on any combination of environment-specific metrics), and can use such performance results to adjust the values of the constants. In this manner, the online merchant 102 can iteratively adjust the constants to provide desired performance. Once the decision system 124 is formally deployed, the online merchant 102 can also use the actual performance of the fulfillment network 118 to further adjust the values of the constants.

Regardless of what equation is used to compute costs, in one implementation, MIMO load balancing functionality 128 can be implemented so that a vector of costs u is calculated by a single load balancer for each group of fulfillment centers (as MIMO load balancer 202).

In at least one implementation, MIMO load balancing functionality 128 takes into account multiple considerations to derive a vector of costs u calculated by a load balancer as an output metric of the fulfillment network 118 based on multiple different considerations, without relying on a downstream assignment module to make such a multi-consideration determination. Rather, the network load balancer serves the vector u to the fulfillment center assignment module, (as in load balancer 202 and network fulfillment center assignment module 210).

MIMO Calculations

The multivariable load balancing system employs an n dimensional multiple-input-multiple-output (MIMO) controller. In general, the operation of the multivariable load balancing system can be expressed in scalar notation. That is, the MIMO controller receives a scalar version of values corresponding to fulfillment centers 120 (e.g. 120(1)-120(4)). There can be any number of values corresponding to the fulfillment centers 120.

To illustrate, the following variables, parameters and indices will be used:

j Particular fulfillment center
k Time index
k' Current time
x Projected fraction of assignments to managed fulfillment centers, a vector
u Load balancing cost, also termed penalty cost, a vector
a Projected volume of assignments to managed fulfillment centers, a vector
$a^m$ Measured volume of assignments to managed fulfillment centers, a vector
b Natural assignment as from open-loop system, a vector
G Gain, a matrix
β Ratio of load-balanced volume to network volume
z Projected fraction of system level goal, a vector
T Target share assignment for closed-loop system, a vector
w Weight for deviating from target, a vector
ẇ Weight for load balancing costs, a vector
v Volume, a vector
LBv Load-balanced volume
NWv Network volume
N End of horizon (e.g., end of period, end of week)

From these values, a scalar version of assignment x for the fulfillment centers 120 that are managed is computed. The operation of the MIMO, in aggregate, can be expressed in vector notation. In this case, the collection of scalar values ($b_1, b_2, \ldots b_j$) supplied to MIMO load balancer defines a vector b corresponding to the base or natural assignment of the fulfillment centers 120. The scalar load-balancing or penalty cost values ($u_1, u_2, \ldots u_j$) produced by the MIMO load balancer defines a cost vector u. A gain matrix G defines the manner in which the base vector b is transformed via the cost vector u to obtain the assignment to the vector of managed fulfillment centers x.

$$\vec{x} = G\vec{u} + \vec{b} \tag{3}$$

Equation (3) can also be expressed as a scalar via equation (4).

$$x_j = \sum_i G_{ij} u_j + b_j \tag{4}$$

Figure 3A:
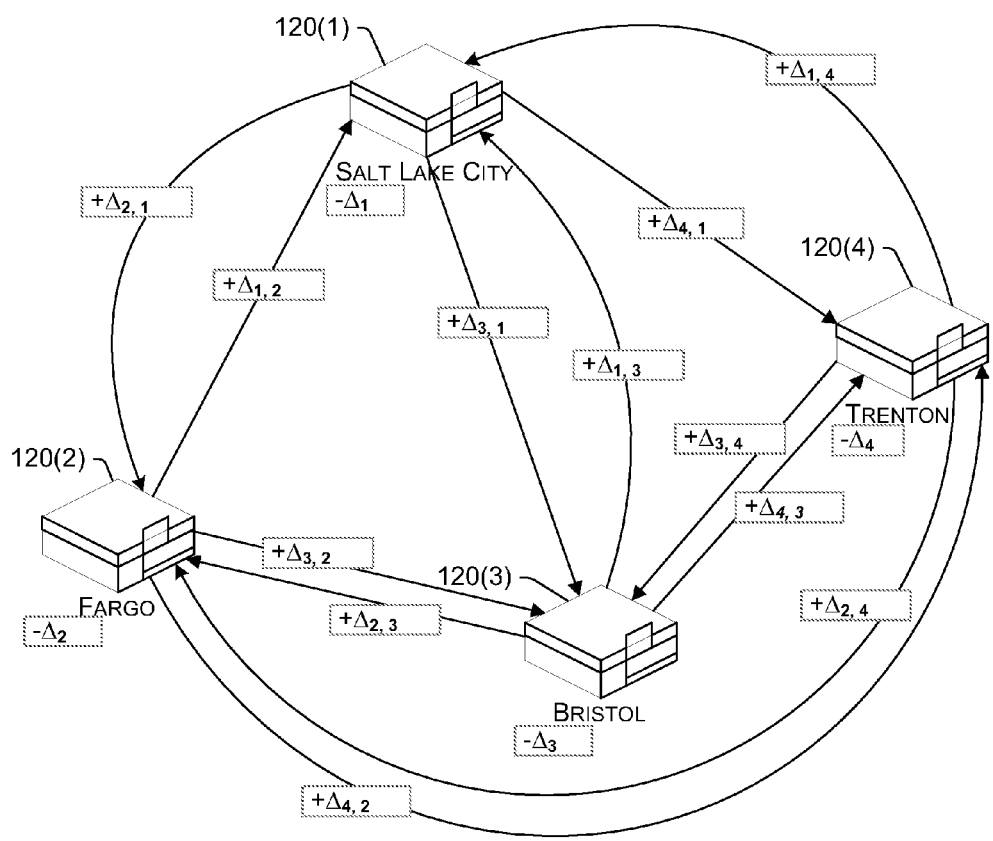
FIG. 3A illustrates an example of a decision system in which multivariable load balancing is performed.

In Multiple-Input-Multiple-Output control, a variable number of n dimensional components contribute to the control action to determine a set of load balancing costs to drive selected (e.g., managed) fulfillment centers from baseline to target in one step represented by the quantitative model shown in FIG. 3A.

FIG. 3A shows the effects of MIMO control on fulfillment network 118, a tightly coupled system, for the following exemplary portion of a matrix G shown in

TABLE 1

| G = | Salt Lake City 120(1) | Fargo 120(2) | Bristol 120(3) | Trenton 120(4) | ... | 120(j) |
|---|---|---|---|---|---|---|
| Salt Lake City 120(1) | −10 | +3 | +3 | +4 | | |
| Fargo 120(2) | +5 | −7 | +1 | +1 | | |
| Bristol 120(3) | +1 | +2 | −5 | +2 | | |
| Trenton 120(4) | +4 | +2 | +1 | −7 | | |
| . . . 120(j) | | | | | | |

As illustrated in Table 1, above, and in FIG. 3A, circulation is induced on the fulfillment network 118. Circulation is represented via each column, and relative cost applied to particular fulfillment resources to effect circulation is represented via each row. When load is pushed away from one fulfillment center (e.g., 120(1)), the delta of the load is pushed to other fulfillment centers (e.g., 120(2), 120(3), and 120(4)). Simultaneously, when load is pushed away from another fulfillment center (e.g., 120(2)), the delta of the load is pushed to other fulfillment centers (e.g., 120(1), 120(3), and 120(4)). In FIG. 3A, the data of the natural baseline b for each fulfillment center 120 is forced toward the fulfillment centers' 120 respective targets T. Targets T represent the fulfillment centers' respective assigned shares of the volume of the network. The movement from base b to target T for respective fulfillment centers produces a delta of network load for that fulfillment center. In moving some percentage of network volume away from one fulfillment center, corresponding volume has to be added to other fulfillment centers such that the net delta volume for the fulfillment network is zero.

Table 2 shows an example of adjustments for an exemplary fulfillment network 118 such that net delta volume for the fulfillment network is zero at a given time.

TABLE 2

| Fulfillment Centers 120 | Natural Volume | System Level Goals |
|---|---|---|
| 120(1) | $b_1 = 25\%$ | $T_1 = 30\%$ |
| 120(2) | $b_1 = 30\%$ | $T_1 = 20\%$ |
| 120(3) | $b_1 = 40\%$ | $T_1 = 41\%$ |
| 120(4) | $b_1 = 5\%$ | $T_1 = 9\%$ |

Thus, as illustrated in Table 2, the flow of volume through the multivariable load balancing system will change over time as fulfillment centers 120 are driven toward their targets. Therefore, equation (4) becomes equation (5) where (k) is a time index:

$$x_i(k) = \sum_i G_{ij} u_i(k) + b_i(k) \qquad (5)$$

In one implementation, for example, aspects of the time component include day of week and hour of day components. Other time components are possible. Furthermore, process implementations may use dynamic or historic parameters. For example, specific parameters may be dynamic or static (e.g., b may be ascertained from historic data of varying granularity such as by hour of day or by the day of the year). Furthermore, combinations of parameters may be used (e.g., b may be ascertained from historic data of varying granularity such as by hour of day and by the day of the year). This capability enables the multivariable load balancing system to forego having analysts make adjustments to drive fulfillment centers 120 to their respective targets, and allows for adjustments in the fulfillment network load in anticipation of changes in total network volume.

Figure 3B:
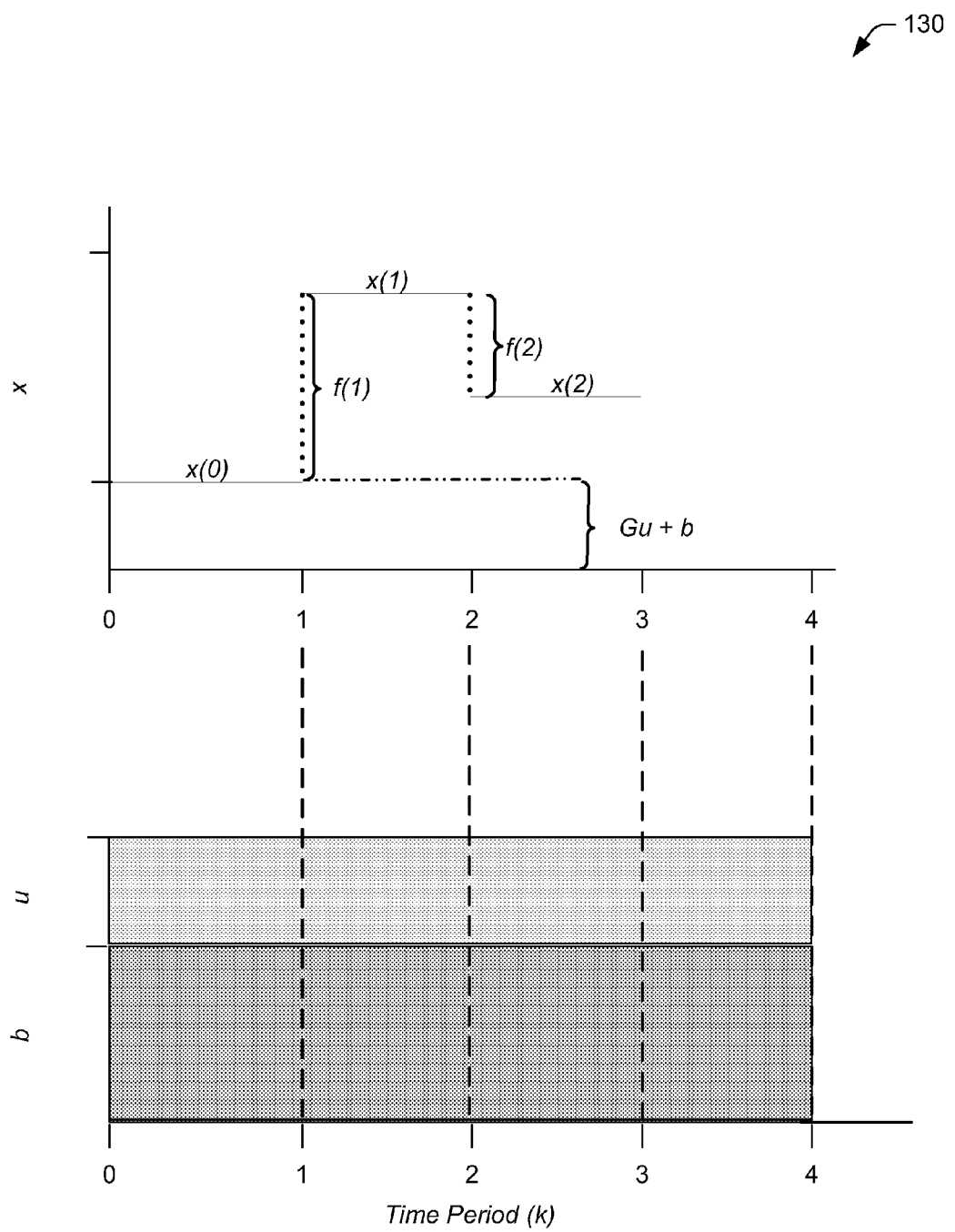
FIG. 3B shows a cumulative histogram to illustrate the manner in which MIMO load balancing functionality accommodates disturbances in a fulfillment network.

FIG. 3B shows a cumulative histogram to illustrate the manner in which MIMO load balancing functionality accommodates disturbances in a fulfillment network. A feedback term is added to equation (5) to incorporate this cumulative aspect, resulting in equation (6).

$$\vec{x}(k) = G\vec{u}(k) + \vec{b}(k) + \vec{f}(k) \qquad (6)$$

To review the terms in equation (6), over time (k), the volume assigned x for the $j^{th}$ managed fulfillment center in the fulfillment network 118 is determined via matrix (G) representing the defined group of fulfillment centers 120 (e.g., 120(1)-120(4)). The sum of matrix (G) is multiplied by vector u representing the load balancing cost to be applied to drive each group of fulfillment centers 120 to their target order assignments. In this example, u is constant. The product is added to vector b representing the base or natural volume for each group of fulfillment centers 120. In this example, b is constant. Feedback or bias is added to the equation; (f) representing the feedback term. The cumulative aspect of multivariable load balancing for the fulfillment network is represented by (f) for each managed fulfillment center (j) during time (k). f(k)=measured volume−plan volume. In other words, $f(k)=x^{measured}(k-1)-x(k-1)$. Thus, the periodic decision process controlled by the decision system 124 defines a continuous process.

In other words, the contribution of the term f(k) takes into account past behavior of the control structure, and particularly a load balancer (e.g., load balancer 202, to be discussed in more detail below) keeps actual volume compared to target volume from deviating over time while minimizing the costs applied to accomplish that goal. For example, the load balancer controls deviation from an associated share target, within a range, and beyond definable limits. Updating u based on incremental measurements facilitates accommodating disturbances in the system. Exemplary disturbances may include mistakes in modeling of G, misestimating b, and u being non-linear. Any number of other disturbances may be accommodated. Additionally, this system may be used in a predictive manner for predicting consequences of change on the fulfillment network. Exemplary changes include redefining G (e.g., nationally, regionally, globally, or as a combination or composite), redefining b, adding fulfillment centers, trade and labor disruptions. Other changes are contemplated.

Minimizing deviation from system-level goals is accomplished utilizing a calculation of weighted least squares with the relationship of equation (7).

$$\min \|z-T\|^2 = \Sigma w_j (z_j - T_j)^2 \qquad (7)$$

Control Structure Variation A: Cascaded Decision Systems

To review, FIG. 2 illustrates an implementation in which the decision system 124 is implemented by a single MIMO load balancer 202 acting periodically. In other implementations, the control structure can be modified to include two or more tiers of decision systems, each of which may include their own load balancers such as MIMO load balancer 202, or other load balancers. The output of one decision system tier can be fed as input into a lower-level decision system tier, and so forth.

Figure 4:
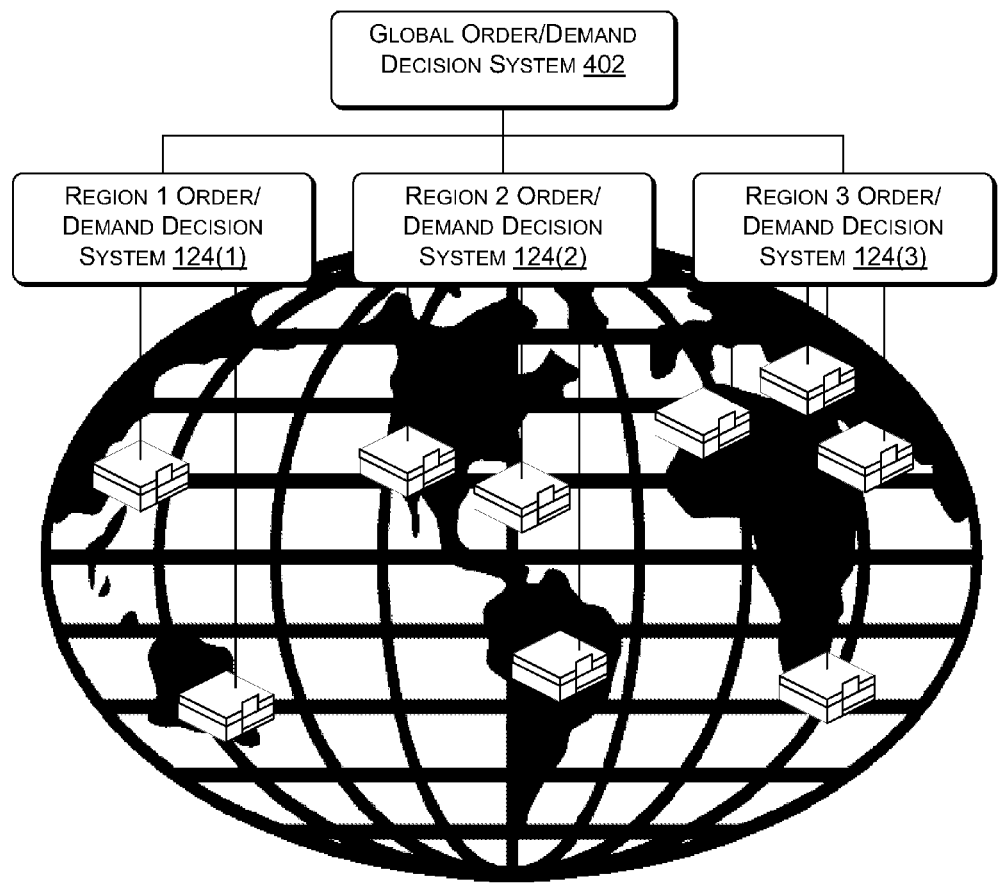
FIG. 4 illustrates another example of a decision system in which load balancing is performed on both global and regional levels.

Consider, for example, FIG. 4. This figure shows a first tier that includes a global decision system 402. This figure also shows a collection of regional decision systems 124(1), 124(2), and 124(3). As the names suggests, the global decision system 402 makes assignment decisions on a global level, encompassing multiple regions. The individual regional decision systems 124 make decisions appropriate to individual associated regions. For example, individual regional decision systems can serve different hemispheres of the world, continents, countries, provinces, states, cities, and so forth. Although only two tiers are shown in FIG. 4, a decision system hierarchy can accommodate more than two levels of decision systems.

In one implementation, when an order is received, the global decision system 402 is invoked to determine which regional decision system 124 should be used to further process an order. The selected regional decision system 124 can then decide which fulfillment resource (e.g., which fulfillment facility) within its respective domain should be assigned to process an order. For example, when an order is received by a Japanese customer (who happens to reside in Japan), the global decision system 402 may determine that an Asian-based regional decision system 124(1) should be assigned the task of further processing the order. The Asian-based regional decision system 124(1) then goes to work, deciding which fulfillment center should be given the task of processing the order.

Each decision system in the architecture of FIG. 4 can incorporate MIMO load balancing functionality 128 or some other closed loop control functionality. In the manner described above, the load processing functionality 128 computes a series of costs u which are used by MIMO load balancer 202—along with other considerations—to determine how to process a volume of orders. The decision of the MIMO load balancer 202 in a particular tier invokes a regional decision system in a lower level tier, upon which the above-described processing is repeated for that level. In an alternative implementation, the cascaded analysis performed in the multiple tiers can be combined in part or in whole, such that global and regional decision-making is performed at the same time. Still other variations of this design strategy are possible.

Exemplary Computing Device

Figure 5:
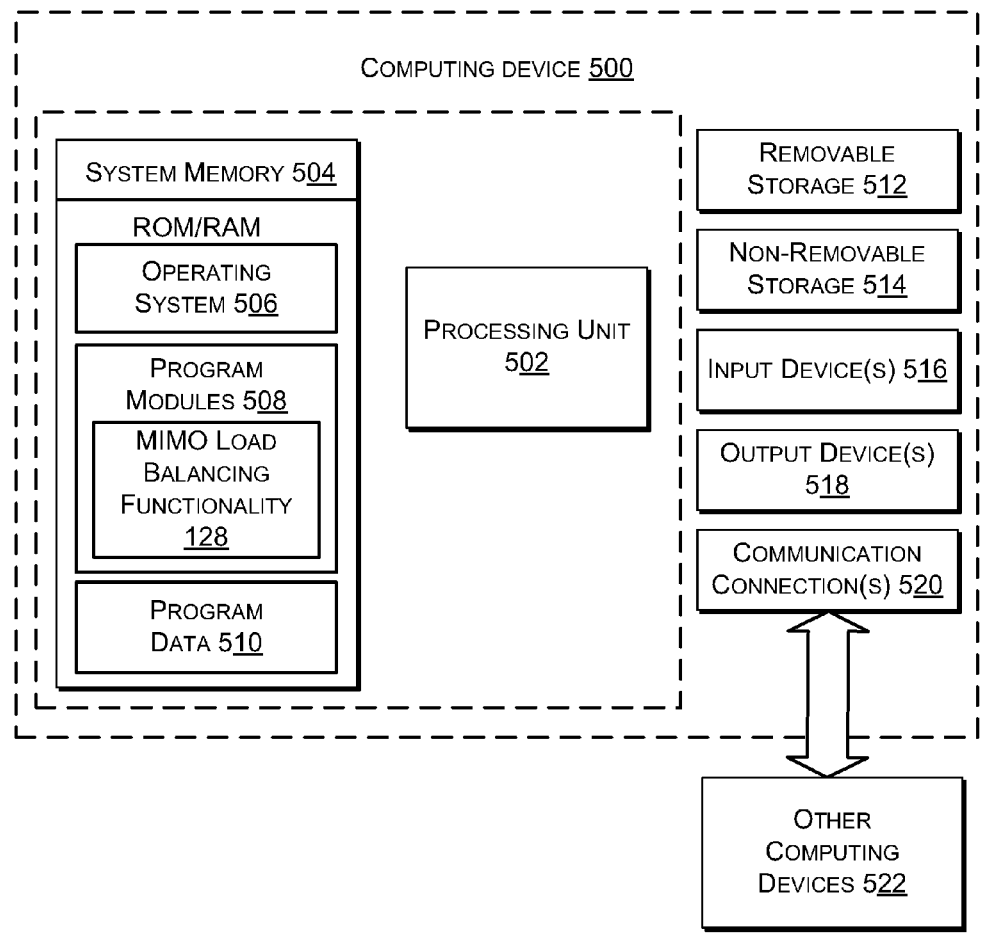
FIG. 5 is a block diagram showing functional modules in a computing device that can be used to implement different aspects of the architectures of FIG. 2

FIG. 5 illustrates an exemplary computing device 500 that can be used to implement aspects of decision system 124 introduced in the context of FIG. 2. For example, this computing device 500 can represent one or more of the servers 126 used by the decision system 124. (And insofar as the computing device 500 includes conventional computing hardware, FIG. 5 also represents functionality that can be used to implement any other computer-related aspect of the architecture 100 shown in FIG. 1, such as the web server equipment 108, individual computer devices 106, and so forth). The computing resources shown in FIG. 5 can be implemented at a single site or distributed over plural sites.

The computing device 500 in this example includes at least one processing unit 502 and system memory 504. Depending on the configuration and type of computing device 500, the system memory 504 can be implemented as volatile memory (such as RAM), non-volatile memory (such as ROM, flash memory, etc.), or some combination of the two. The system memory 504 can include an operating system 506, one or more program modules 508, program data 510, and so forth. In the context of the present subject matter, the program modules 508 can include the MIMO load balancing functionality 128 and potentially other aspects of the control structure of FIG. 2 (such as the network fulfillment center assignment module 210). In general, the program modules 508 can be implemented as computer-readable instructions, various data structures, and so forth. The computer-readable instructions can be expressed using any programming technology. The instructions can also include markup language content (e.g., XML).

The computing device 500 can include additional features or functionality. For example, the computing device 500 can also include additional data storage devices, such as removable storage 512 and/or non-removable storage 514 (e.g., magnetic disks, magnetic tape, optical disks, static RAM devices, and so forth), along with associated media reading/writing functionality.

The computing device 500 can also include various input device(s) 516, such as a keyboard, a mouse, a voice input device, a touch input device, and so on. The computing device 500 can also include various output device(s) 518, such as a display, speakers, printer, and so on. Finally, the computing device 500 can also include a communication interface 520 that allows the device 500 to communicate with other computing devices 522 over the network 104 of FIG. 1. The communication interface 520 can be implemented in any fashion, such as broadband (e.g., T1) interface, a telephone modem interface, a cable modem interface, a DSL-type interface, and so forth.

One or more bus structures (not shown) internally couple each of the above-described modules together.

Operation

Figure 6:
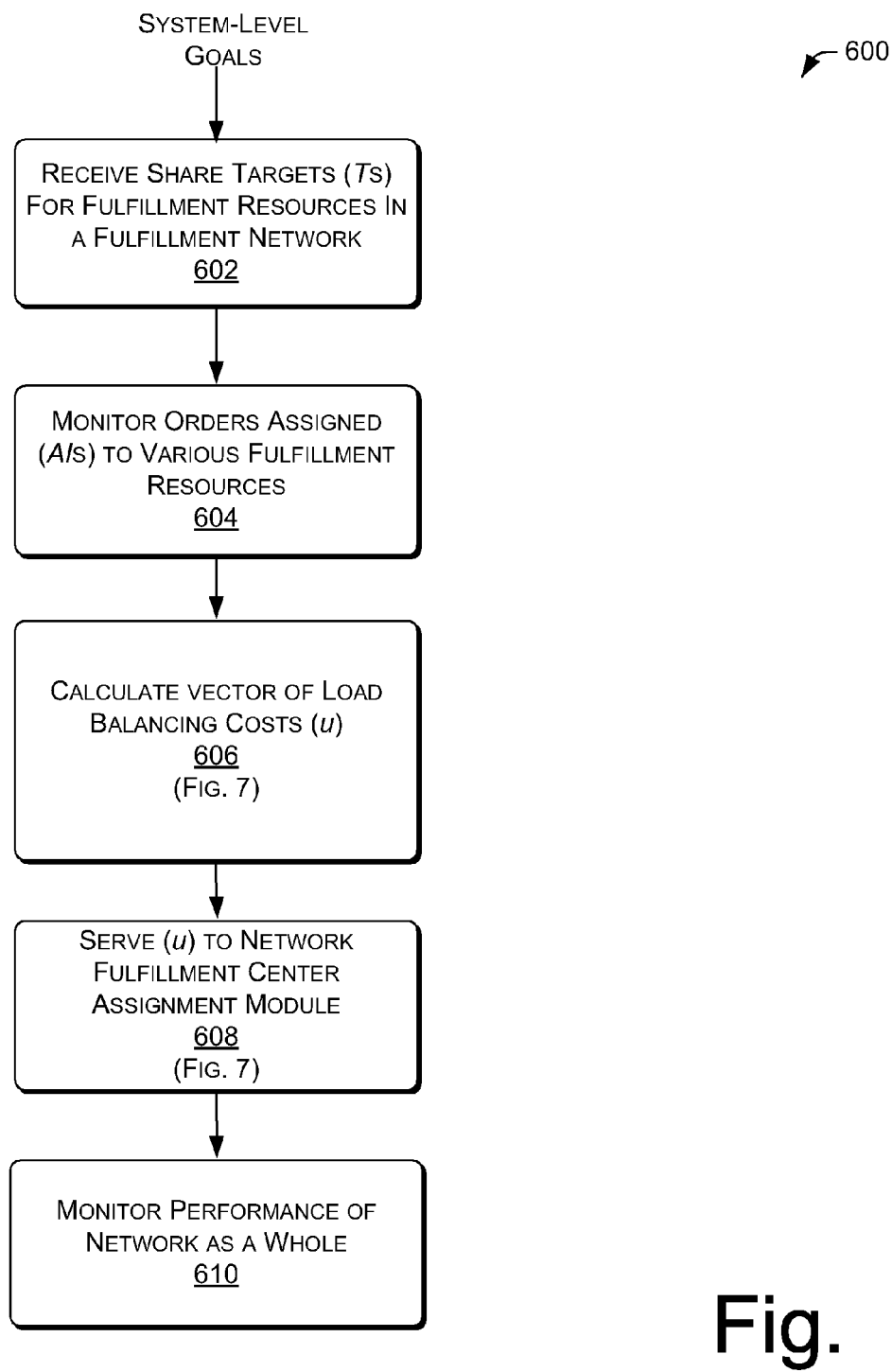
FIG. 6 is a flow diagram of a process for balancing requests across multiple fulfillment resources in a fulfillment network.

FIG. 6 shows a process 600 for balancing requests across multiple fulfillment resources in a fulfillment network via MIMO load-balancer 202. The process is illustrated as a collection of blocks in a logical flow graph, which represent a sequence of operations that can be implemented by the MIMO load balancing functionality 128. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The sequence in which the operations are described should not be construed as a limitation, and any number of the described blocks can be combined in any sequence and/or in parallel to implement the process. To facilitate explanation, the process 600 is described with reference to the architecture 100 of FIG. 1B and the control structure of FIG. 2.

In step 602, system level goals including share targets (T) in a fulfillment network are received by the multivariable load balancing system. In the example set forth in FIG. 1B, the fulfillment resources correspond to different fulfillment centers 120. The share targets can be expressed in various ways, such as percentages. For example, a particular share target might define the percentage of total order volume that a particular fulfillment center is required to process. The share targets are selected based on performance considerations that are pertinent to the operation of the fulfillment network 118 as a whole. In step 604, the decision system 124 monitors the orders assigned to the fulfillment resources, as reflected by the AI values. These assignments do not necessarily reflect the actual items shipped out to customers (SIs), because the fulfillment resources might not be able to fulfill all of the assigned orders (e.g., due to reassignments, cancellations, etc.).

In step 606, the decision system 124, via load balancer 202, calculates load balancing costs, vector u, based on the performance data (e.g., AI values) collected in step 604, along with other considerations and serves vector u to the fulfillment center assignment module 210. Step 606 generally represents the kind of processing described in the context of FIG. 2.

In step 608, the decision system 124, via load balancer 202, serves vector u to the fulfillment center assignment module 210.

In general, the procedure 600 shown in FIG. 6 illustrates a feedback loop in which assignments (AI) are continually being monitored in step 604, the vector of load balancing costs, vector u, is periodically updated in step 606, and a vector of costs influencing new assignments are continually being served in step 608 in response to the monitored assignments and the share targets (T). Moreover, in the operation of the control structure 124, analysts 206 may redefine system-level goals which may change the set point targets (SPs) at any time based on any number of considerations, e.g., based on an assessment of the performance of the fulfillment network 118 as a whole, (e.g., including order cancellations, returns, etc.) as determined in step 610. This aspect of FIG. 6 defines a feedback loop. The results of the feedback loop govern the determination of cumulative volume assigned to a fulfillment center 120 as an integral of volume through time. Thus, in an event that the volume of the fulfillment network 118 is either lighter or heavier than expected, the consequences may be spread across the fulfillment centers 120.

Figure 7:
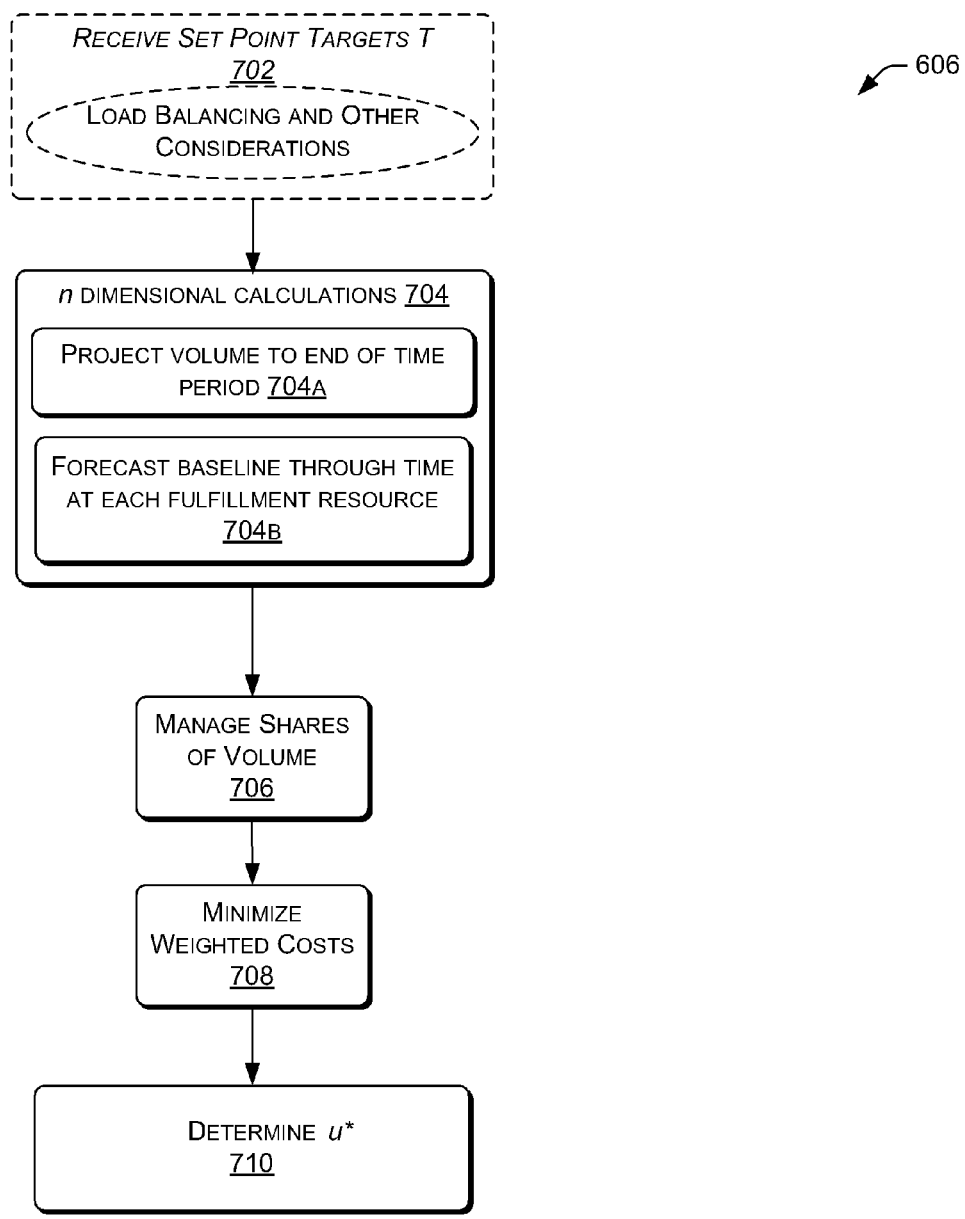
FIG. 7 is a flow diagram showing the multivariable load balancing operation of FIG. 6 in greater detail.

FIG. 7 provides more detail regarding one exemplary implementation of step 606 of FIG. 6. The operations shown in FIG. 7 take place in the context of the processing of multiple orders for multiple fulfillment centers in a fulfillment network over a period of time.

In step 702 the control structure (of FIG. 2) including a MIMO load balancer 202 receives set point targets T, load balancing, and other considerations. In step 704 the MIMO load balancer 202, performs n dimensional calculations to determine a vector of load-balancing costs u to be applied to the n fulfillment centers to steer the performance of the fulfillment centers 120 to respective set point targets (T) simultaneously. For example, as explained in the context of FIG. 2, the load balancing network 118 may include different groups of fulfillment centers (e.g., managed fulfillment centers and drop-ship fulfillment centers). Performing n dimensional calculations to determine a vector of load-balancing costs u, step 704 may further include sub-steps. In sub-step 704A the MIMO load balancer 202, projects total volume to the end of a predetermined time period, (e.g., end-of-week). In sub-step 704B the MIMO load balancer 202, forecasts a baseline through time, for the time remaining in the predetermined time period at each fulfillment resource 120. In step 706 the single MIMO load balancer 202 facilitates driving shares of volume for at least one group of fulfillment centers (e.g., fulfillment centers 120) via generating an optimization problem to minimize total costs to be applied to achieve targets T. In step 708 the MIMO load balancing functionality 128 minimizes a weighted cost to be applied over time to the variety of fulfillment centers via solving the optimization problem, such as by solving a quadratic program.

In one implementation, a greater cost may be borne in order to achieve targets by particular fulfillment resources based on including additional considerations in the optimization problem. For example, a different w may be provided to selectively drive a particular fulfillment resource closer to its target at the expense of another fulfillment resource not achieving its target.

The canonical form of the optimization problem is provided below, where s is a vector of decision variables.

$$\min \tfrac{1}{2} s^{transpose} Qs + C^{transpose} s$$

$$\text{subject to } As = b$$

$$s \geq 0$$

The details of an example of a particular quadratic program are provided below.

$$\min \sum_j \frac{1}{w_j^2}(z_j(N) - T_j)^2 + \sum_k \sum_j \frac{1}{\hat{w}_j^2} u_j^2(k)$$

subject to:

$x_j(k) = \Sigma_i G_{ji} u_i(k) + b_j(k)$, for all $k, j$ $\Sigma_{k \leq k'} a_j^m(k) + \Sigma_{k > k'} a_j(k) = z_j(N) \Sigma_k LBv(k)$, for all $j$ $a_j(k) = \frac{1}{\beta} LBv(k) x_j(k)$, for all $j, k > k'$ $u_j(k), x_j(k), z_j(N) \geq 0$, for all $k, j$ In step 710, based on the relationships above, the MIMO load balancing functionality 128 determines a solution, u* periodically to drive network fulfillment center assignments to meet system level goals. The vector u, when served to the fulfillment center assignment module 210 results in the managed fulfillment centers meeting set point targets with minimal real world costs.

CONCLUSION

Although the subject matter has been described in language specific to structural features and/or methodological acts, the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving, from user devices, online orders for one or more items of merchandise from users associated with individual ones of the user devices;
   defining a fulfillment network having a plurality of fulfillment resources configured to fulfill the online orders, wherein the plurality of fulfillment resources fulfill the online orders by preparing to distribute the one or more items of merchandise from individual fulfillment resources to the users;
   determining a share of a volume of the online orders in the fulfillment network to assign to each individual fulfillment resource of the plurality of the fulfillment resources, wherein for an individual fulfillment resource of the plurality of the fulfillment resources, the determining comprises:
   receiving, by a computer, a share target that defines a load balancing target for the individual fulfillment resource, wherein the share target represents a percentage of the online orders to be fulfilled by the individual fulfillment resource;
   calculating, by the computer, load balancing costs based at least in part on a geographical location of the users and a geographical location of the individual fulfillment resource;
   based at least in part on receiving the share target, performing n-dimensional calculations to determine a vector of the load balancing costs to be applied to each of the individual fulfillment resources to drive performance of each of the individual fulfillment resources to a corresponding load balancing target within a same period of time;
   assigning, by the computer, online orders to the individual fulfillment resource based at least in part on the load balancing costs and the vector;
   monitoring, by the computer, existing online order assignments to the plurality of fulfillment resources to provide performance data; and
   redefining, by the computer, the load balancing target based at least in part on the load balancing costs and the performance data.

2. The computer-implemented method of claim 1, wherein:
   individual fulfillment resources of the plurality of fulfillment resources correspond to different respective fulfillment centers for processing the online orders; or
   the individual fulfillment resources include at least one fulfillment center having multiple processing queues available to perform one or more actions with respect to the one or more items, at least one processing queue of the multiple processing queues being available to process disparate items of the one or more items.

3. The computer-implemented method of claim 1, wherein individual fulfillment resources of the plurality of fulfillment resources correspond to different respective item-related queues associated with the online orders.

4. The computer-implemented method of claim 1, wherein the performance data includes at least one of:
   an order cancellation;
   a return of individual items of the one or more items;
   a number of individual items of inventory associated with the individual fulfillment resources of the plurality of fulfillment resources that have been shipped by the individual fulfillment resources; and
   an aggregation of order assignments input into the individual fulfillment resources.

5. The computer-implemented method of claim 1, wherein the determining comprises a Multiple-Input-Multiple-Output (MIMO) algorithm.

6. The computer-implemented method of claim 1, wherein a predetermined parameter instigates the determining.

7. One or more non-transitory computer readable media storing instructions for a decision system, the instructions, when executed by one or more processors, controlling operations comprising:
   defining a fulfillment network having a plurality of fulfillment resources configured to perform fulfillment requests, wherein the fulfillment requests correspond to online orders from users that the plurality of fulfillment resources are configured to prepare for distribution to the users; and
   determining a share of a volume of the fulfillment requests in the fulfillment network to assign to at least one fulfillment resource of the plurality of the fulfillment resources, the determining comprising:
      receiving share targets that define load balancing targets for individual fulfillment resources of the plurality of fulfillment resources, wherein a share target of the share targets represents a percentage of the online orders assigned to an individual fulfillment resource of the individual fulfillment resources;
      calculating load balancing costs based at least in part on a geographical location of the users and a geographical location of the at least one fulfillment resource;
      assigning online orders to the at least one fulfillment resource based at least in part on the load balancing costs;
      monitoring existing assignments to the individual fulfillment resources to provide performance data; and
      redefining the load balancing targets based at least in part on the load balancing costs and performance data, wherein the redefining drives assignment of the requests towards the share targets.

8. One or more non-transitory computer readable media as recited in claim 7, wherein the individual fulfillment resources correspond to geographically distinct fulfillment centers for processing the fulfillment requests.

9. One or more non-transitory computer readable media as recited in claim 7, wherein the individual fulfillment resources correspond to different respective item-related queues associated with the fulfillment requests.

10. One or more non-transitory computer readable media as recited in claim 7, wherein the determining comprises a Multiple-Input-Multiple-Output (MIMO) algorithm.

11. One or more non-transitory computer readable media as recited in claim 7, wherein a predetermined parameter instigates the determining.

12. The computer-implemented method of claim 1, wherein the individual fulfillment resources of the plurality of fulfillment resources include queues for processing the online orders, the queues comprising different queue types that are associated with different time constraints for processing the online orders.

13. The computer-implemented method of claim 1, wherein the calculating the load balancing costs is further based at least in part on at least one of:
   merchandise availability at the plurality of fulfillment resources;
   costs associated with shipping the one or more items; and
   costs associated with producing the one or more items.

14. One or more non-transitory computer readable media as recited in claim 7, wherein the individual fulfillment resources further include at least one fulfillment center having multiple processing queues available to perform one or more actions with respect to the one or more items, the multiple processing queues including at least two different time-related queues.

15. A system comprising:
   a plurality of fulfillment resources associated with a fulfillment network, the plurality of fulfillment resources configured to fulfill online orders comprising instructions from users for the plurality of fulfillment resources to at least prepare to distribute one or more items of merchandise associated with the online orders; and
   one or more servers arranged as a decision system configured to:
      determine a share of a volume of the online orders in the fulfillment network to assign to an individual fulfillment resource of the plurality of the fulfillment resources;
      receive a share target that defines a load balancing target for the individual fulfillment resource, wherein the share target is a percentage of the online orders to be fulfilled by the individual fulfillment resource;
      calculate load balancing costs based at least in part on a geographical location of the users and a geographical location of the individual fulfillment resource;
      based at least in part on receiving the share target, perform n-dimensional calculations to determine a vector of the load balancing costs to be applied to each of the plurality of fulfillment resources to drive performance of each of the plurality of fulfillment resources to a corresponding load balancing target within a same period of time;
      assign online orders to the individual fulfillment resource based at least in part on the load balancing costs and the vector;
      monitor existing order assignments to the plurality of fulfillment resources to provide performance data; and
      redefine the load balancing target based at least in part on the load balancing costs and the performance data.

16. The system of claim 15, wherein:
   individual fulfillment resources of the plurality of fulfillment resources correspond to different respective fulfillment centers for processing the online orders; or
   the individual fulfillment resources include at least one fulfillment center having multiple processing queues available to perform one or more actions with respect to the one or more items, at least one processing queue of the multiple processing queues being available to process disparate items of the one or more items.

17. The system of claim 15, wherein individual fulfillment resources of the plurality of fulfillment resources correspond to different respective item-related queues associated with the online orders.

18. The system of claim 15, wherein the performance data includes at least one of:
   an order cancellation;
   a return of individual items of the one or more items; or
   an aggregation of order assignments input into individual fulfillment resources of the plurality of fulfillment resources.

19. The system of claim 15, wherein the determining comprises a Multiple-Input-Multiple-Output (MIMO) algorithm.

20. The system of claim 15, wherein individual fulfillment resources of the plurality of fulfillment resources include queues for processing the online orders, the queues comprising different queue types that are associated with different time constraints for processing the online orders.

21. The system of claim 15, wherein calculating the load balancing costs is further based at least in part on at least one of:
   merchandise availability at the plurality of fulfillment resources;
   costs associated with shipping the one or more items; and
   costs associated with producing the one or more items.

22. The computer-implemented method of claim 1, wherein n is equal to a number of individual fulfillment resources comprising the plurality of fulfillment resources.

23. One or more non-transitory computer readable media as recited in claim 7, wherein determining the share of the volume of the fulfillment requests further comprises based at least in part on receiving the share targets, performing n-dimensional calculations to determine a vector of the load balancing costs to be applied to each of plurality of fulfillment resources to drive performance of each of the plurality of fulfillment resources to a corresponding load balancing target within a same period of time, wherein n is equal to a number of individual fulfillment resources comprising the plurality of fulfillment resources.

24. The system of claim 15, wherein n is equal to a number of individual fulfillment resources comprising the plurality of fulfillment resources.

25. The system of claim 15, wherein the performance data includes a number of individual items of inventory associated with individual fulfillment resources of the plurality of fulfillment resources that have been shipped by the individual fulfillment resources.

* * * * *